United States Patent
Marcacci

(10) Patent No.: US 7,137,486 B2
(45) Date of Patent: Nov. 21, 2006

(54) SELECTIVE ACTUATION DEVICE

(75) Inventor: Maurizio Marcacci, Leghorn (IT)

(73) Assignee: Piaggio & C. S.p.A., Pisa (IT)

( * ) Notice: Subject to any disclaimer, the term of this patent is extended or adjusted under 35 U.S.C. 154(b) by 0 days.

(21) Appl. No.: 11/047,941

(22) Filed: Feb. 1, 2005

(65) Prior Publication Data
US 2005/0167208 A1 Aug. 4, 2005

(30) Foreign Application Priority Data
Feb. 4, 2004 (IT) .......................... MI2004A0173

(51) Int. Cl.
*F16D 65/14* (2006.01)
*G05G 9/00* (2006.01)

(52) U.S. Cl. ................. 188/2 D; 192/219.4; 74/471 R; 303/10

(58) Field of Classification Search ............... 188/2 D, 188/73.1, 71.5, 353, 354, 358, 156–9, 72.1; 192/93 B, 219.4, 219.6, 219.7; 74/425, 405, 74/471 R, 53–55; 303/3, 10, 15, 20, DIG. 9
See application file for complete search history.

(56) References Cited

U.S. PATENT DOCUMENTS

| | | | | |
|---|---|---|---|---|
| 1,371,984 A | * | 3/1921 | Sibley ..................... 369/227 |
| 2,867,309 A | * | 1/1959 | Martin ..................... 192/219.7 |
| 3,517,790 A | * | 6/1970 | Damon ..................... 192/220.1 |
| 3,844,386 A | * | 10/1974 | Bohannon ................... 188/167 |
| 4,109,548 A | | 8/1978 | Shinohara et al. |
| 4,342,298 A | | 8/1982 | Ganoung |
| 4,870,990 A | * | 10/1989 | Bierling et al. ............. 137/595 |
| 4,966,256 A | * | 10/1990 | Hunt ......................... 188/72.7 |
| 5,492,511 A | | 2/1996 | Kozminski |
| 5,597,180 A | * | 1/1997 | Ganzel ............... 280/124.106 |

FOREIGN PATENT DOCUMENTS

| | | |
|---|---|---|
| DE | 44 06 236 | 8/1995 |
| DE | 197 54 416 | 6/1998 |
| DE | 198 07 762 | 9/1998 |

* cited by examiner

*Primary Examiner*—Melody M. Burch
(74) *Attorney, Agent, or Firm*—Hedman & Costigan; James V. Costigan

(57) ABSTRACT

Selective actuation device (1) comprising and actuator (5) acting upon an actuation lever (7) that has at least one thrusters element (7b) for the actuation of a first operating group (12, 13) and a cam element (6) mobile between an activation position in which it acts upon a second operating group (9, 10) and a rest position in which the activation of the first operating group (12, 13) is disassociated from the second operating group (9, 10).

2 Claims, 5 Drawing Sheets

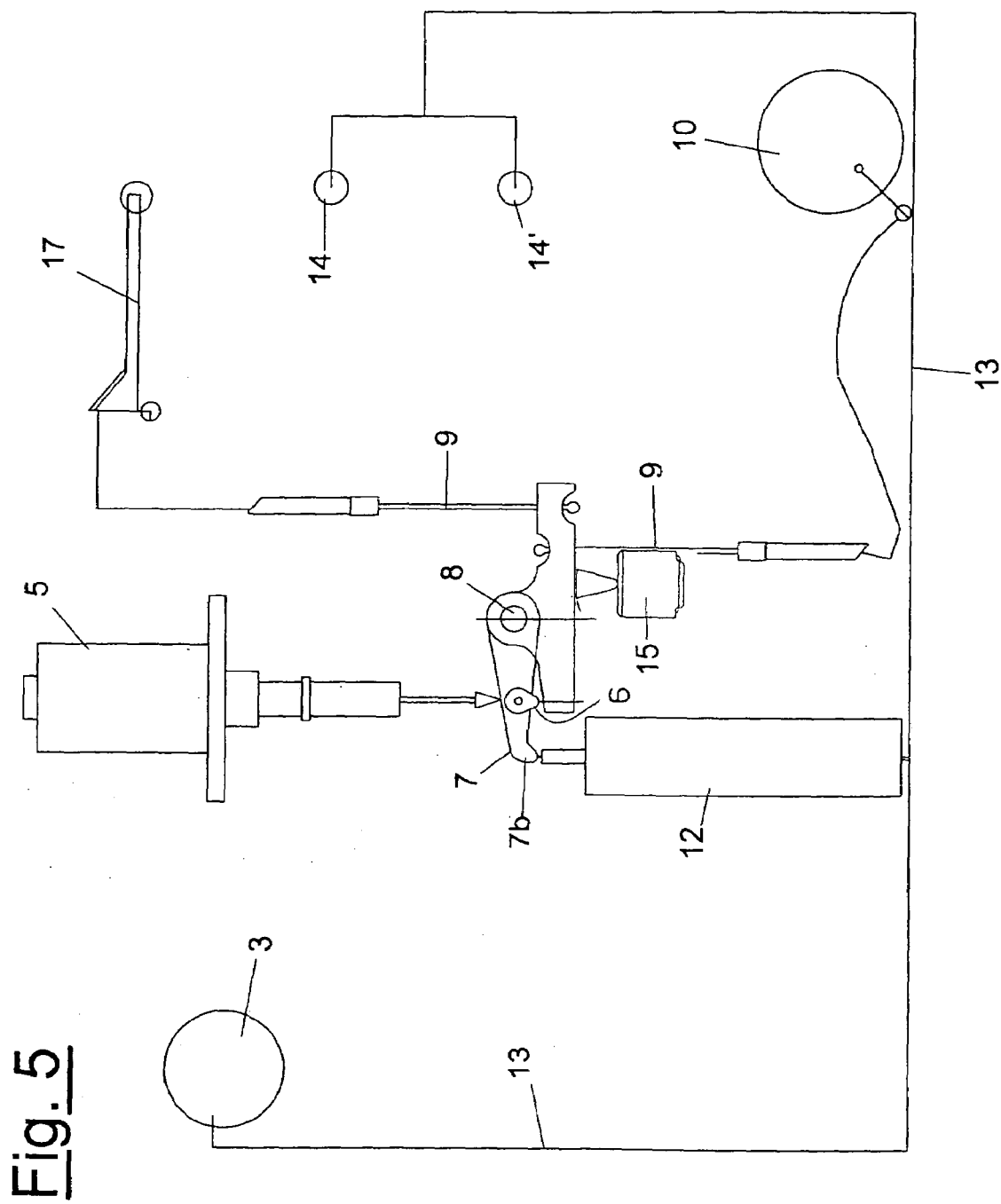

SELECTIVE ACTUATION DEVICE

CROSS-REFERENCE TO RELATED APPLICATION

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

REFERENCE TO A MICROFICHE APPENDIX

Not Applicable

BACKGROUND OF THE INVENTION (1) Field of the Invention

The present invention concerns a selective actuation device and in particular an actuation device for brakes and locking devices of vehicles.

(2) Description of Related Art

It is well known that currently in the field of vehicles a substantial diversification of models has gradually been proposed, in particular there is a growing interest towards "hybrid" vehicles that combine the characteristics of motorcycles, in terms of handling, with the stability of four-wheeled vehicles. Such models are, for example, represented by three-wheeled vehicles equipped with two steered front wheels and four-wheeled vehicles known by the name QUAD.

In these increasingly complex vehicles it is necessary to foresee various interrelated operating groups such as anti-rolling systems and stroke stop devices of the suspensions and brakes.

Indeed, it is possible that during some manoeuvres, for example during temporary stops for parking or at traffic lights, it is necessary, in addition to the braking of the wheels, for the stroke of the suspensions to be stopped to avoid overbalancing that can cause the rider to fall off.

During normal operation of the vehicle, on the other hand, it is necessary for the brakes to be able to be actuated independently of any other group.

In light of the above, there is clearly a need to be able to have a selective actuation device that by itself allows the insertion and/or withdrawal of the different operating groups, such as the rear brake, the stroke stop system of the suspensions and an anti-rolling system, to be controlled.

Therefore, the purpose of the present invention is that of solving the problems of the prior art providing a selective actuation device that is reliable and safe and the ensures the stability of the vehicle in all travel conditions.

Another purpose of the present invention is that of providing a selective actuation device that is simple and cost-effective to produce.

BRIEF SUMMARY OF THE INVENTION

These and other purposes are accomplished by the selective actuation device according to the present invention which comprising and actuator (5) acting upon an actuation lever (7) wherein said lever (7) comprises at least one thruster element (7b) for the actuation of a first operating group (12, 13) and a cam element (6) mobile between an activation position in which said cam (6) acts upon a second operating group (9, 10) and a rest position in which the activation of said first operating group (12, 13) is disassociated from said second operating group (9, 10).

Further characteristics of the invention are highlighted in the subsequent claims.

Substantially, an selective actuation device according to the present invention is of the type comprising an actuator, acting upon an actuation lever that has at least one thruster element for the actuation of a first operating group, and a cam element mobile between an activation position in which it acts upon a second operating group and a rest position in which the activation of the first operating group is disassociated from the second operating group.

BRIEF DESCRIPTION OF THE SEVERAL VIEWS OF THE DRAWINGS

Further characteristics and advantages of the present invention shall become clearer from the present description, given for illustrating and not limiting purposes, with reference to the attached drawings, in which:

FIG. 5 is a schematic view of the hydraulic circuit commanded by the actuation device of FIG. 4.

With reference to FIGS. 1, 2 and 3, a selective actuation device 1 according to the present invention is shown.

DETAILED DESCRIPTION

Figure 1:
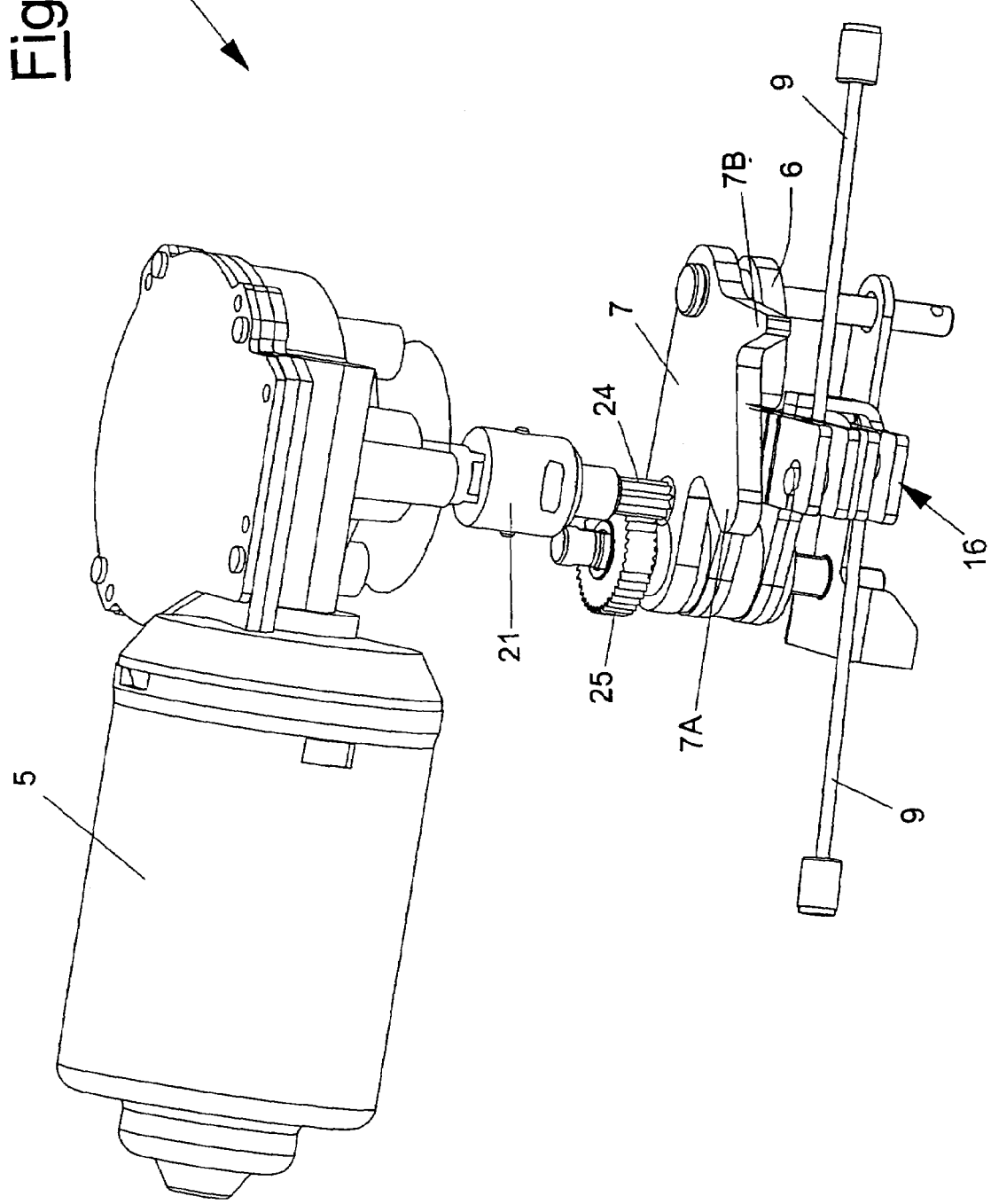
FIG. 1 is an axonometric view of a selective actuation device according to the present invention.

Hereafter, in order to better understand the invention, the description shall focus upon application onto a rolling three-wheeled vehicle with two steered front wheels and a rear wheel.

In particular, the selective actuation device shall control the possibility of simultaneously actuating or of preventing one or more operating groups, according to the user's requirements.

In detail, the operating groups controlled simultaneously by the device according to the present invention are represented by the cable 9 and by the brake-shoe 10 of the rear brake of the vehicle and by a hydraulic group in turn made up of a pump 12 and a hydraulic circuit 13 for the activation of a stroke stop device 14, 14' of the suspensions and of a locking device 3 of an anti-rolling system.

Although the present description is aimed at the aforementioned operating groups it is clear how it must not be considered to be limited to this specific use.

Figure 2:
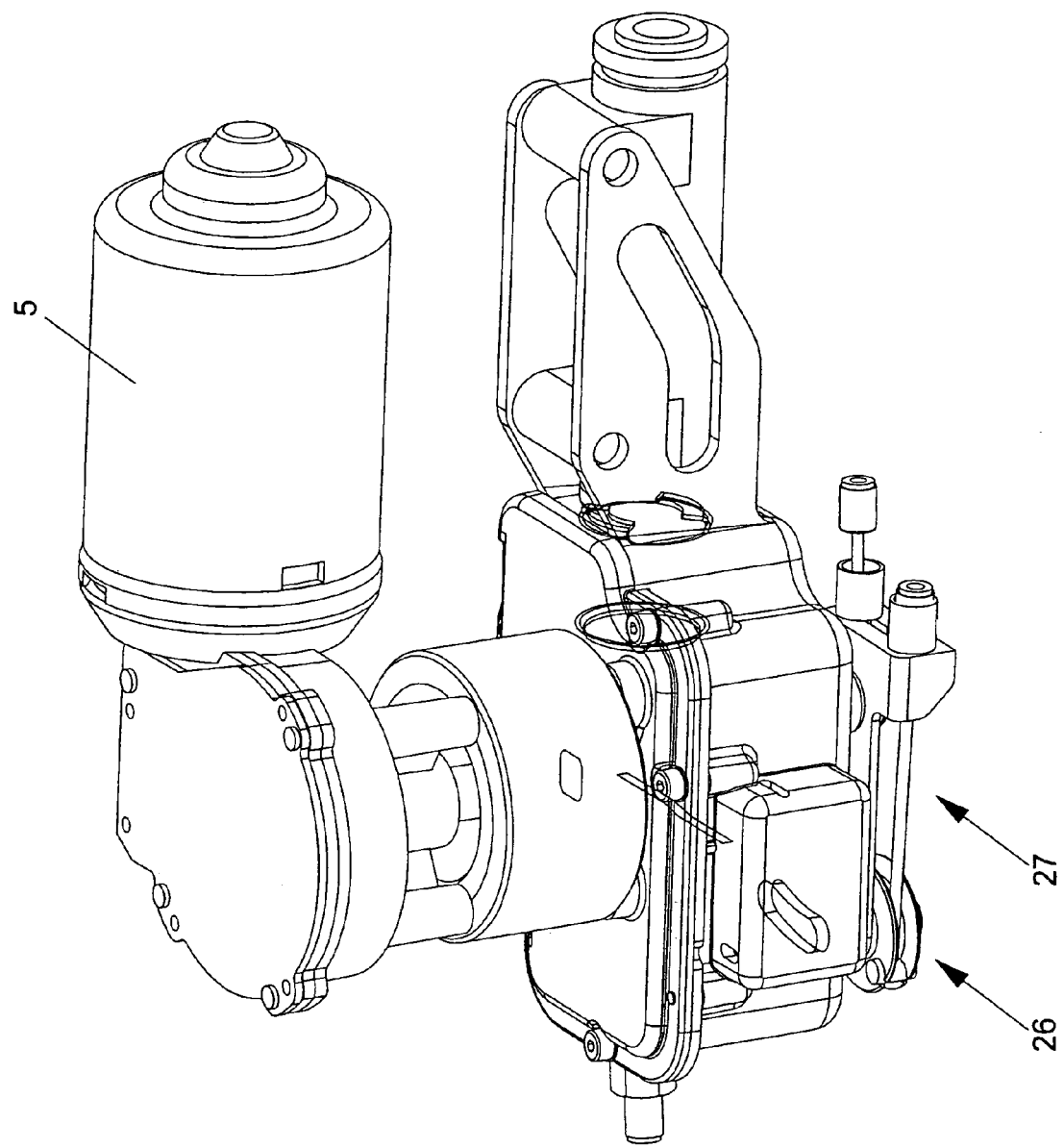
FIG. 2 is another axonometric view of the selective actuation device according to the present invention.
Figure 3:
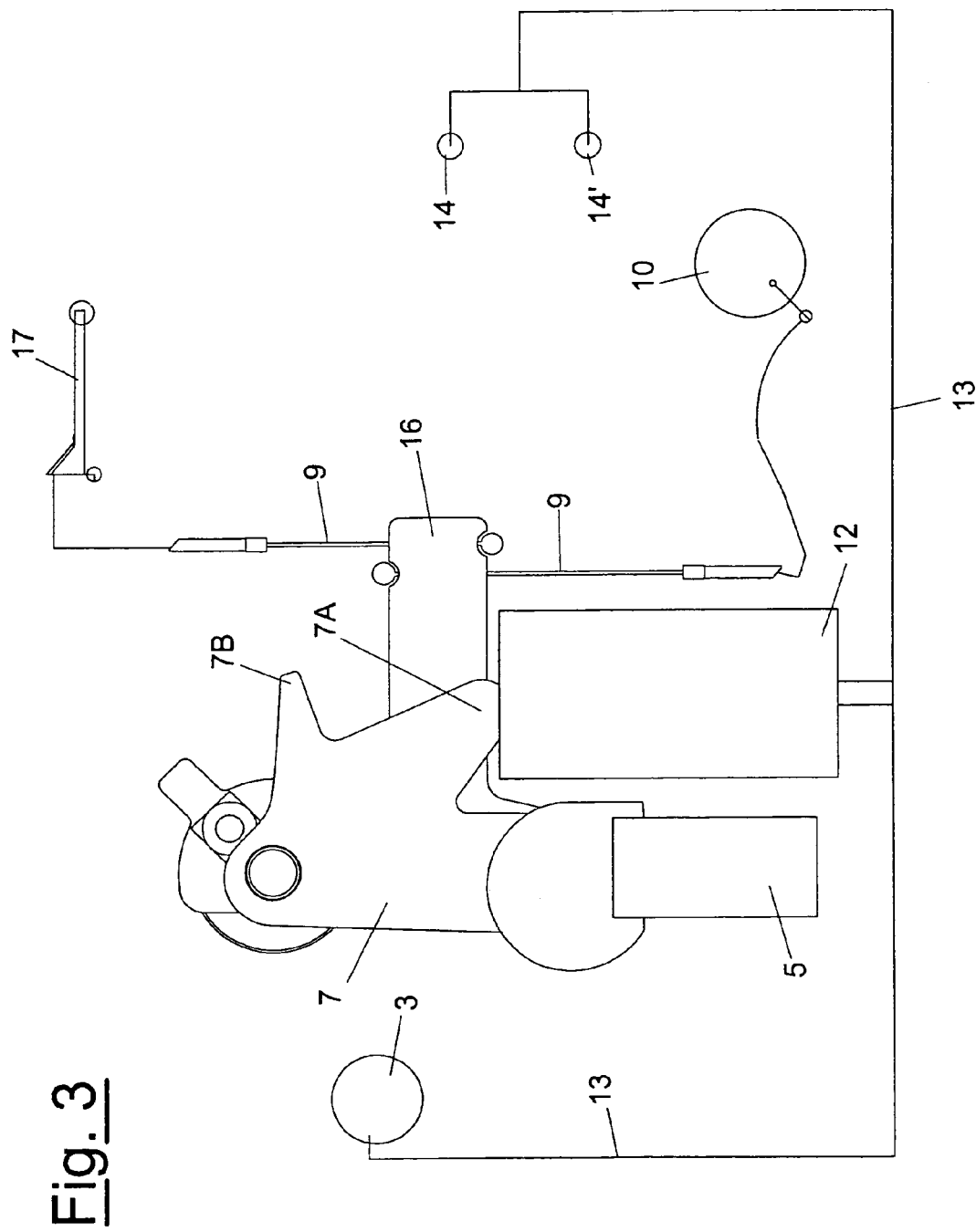
FIG. 3 is a schematic view of the actuation device according to the present invention connected to two operating groups.

The actuation device 1 according to a preferred embodiment, shown in FIGS. 1, 2 and 3, comprises an actuator 5 acting upon an actuating lever 7. The lever 7 comprises a thruster element 7a for the actuation of a first operating group 12, 13 and a cam element 6 mobile between an activation position in which such a cam 6 acts upon a second operating group actuating the rear brake of a vehicle and a rest position in which the activation of the first operating group is disassociated from the second operating group. In particular, the actuation device 1 is equipped with an actuator 5 that acts upon a worm screw 19, which, transmitting the movement to an adapted pinion 21 (with determined transmission ratio), makes a pair of gears 24 and 25 move.

The gear 25, as shown in FIG. 1, is integral with the lever 7 and therefore its rotation causes the rotation of the lever 7.

In its movement the lever 7, through the "thruster" 7A, acts upon the first operating group 12, 13.

The first operating group is represented by an oil pump 12 which, in turn acting upon the hydraulic circuit 13, activates a locking device 3 of an anti-rolling system and the stroke stop devices 14, 14' of the front suspensions.

The same lever 7, as stated previously, also acts upon the cam 6. The cam 6 has the particular characteristic of being able to be inserted, activation position, or withdrawn, rest position. The insertion or withdrawal of the cam 6 takes place through suitable command means such as a desmodromic control 26 activated by a lever, button or by means of cables 27 (FIG. 2) directly by the user.

In activation position, the cam 6 acts upon a release lever element 16 that actuates the cable of the rear brake 9. The cable 9 of the rear brake, acting upon the brake-shoe 10 of the, rear brake, puts the rear wheel in locked position. With the cam 6 in activation position, the selective activation device according to the present invention allows the locking element 3 of the anti-rolling system of the vehicle, the stroke stop devices 14, 14" of the front suspension and the braking of the rear wheel to be activated simultaneously.

It has been stated that the cam 6 also has a rest position: such a position is used to exclude the locking of the rear brake in the case in which it is necessary to move the vehicle with rolling lock inserted. Such a condition is activated by means of the release lever element 16.

The release lever element 16, made up of a series of leverisms, allows the rear brake calliper to disassociate itself from the lever 7. In this case the rotation of the lever 7 actuates the locking device 3 of the anti-rolling system and the stroke stop device 14, 14', but does not lock the rear brake.

However, it should be observed that in no condition of the cam 6 does the actuation in a known way of the rear brake, in other words through a pedal or manual lever 17, also involve the actuation of the pump 12.

According to an advantageous aspect of the present invention, the lever 7 is shaped in such a way as to have a projection 7B that acts as a switch, in the sense that it acts upon a microswitch (not shown) that sends a signal to a control unit for the detection that the first operating group 12, 13 is operating.

Figure 4:
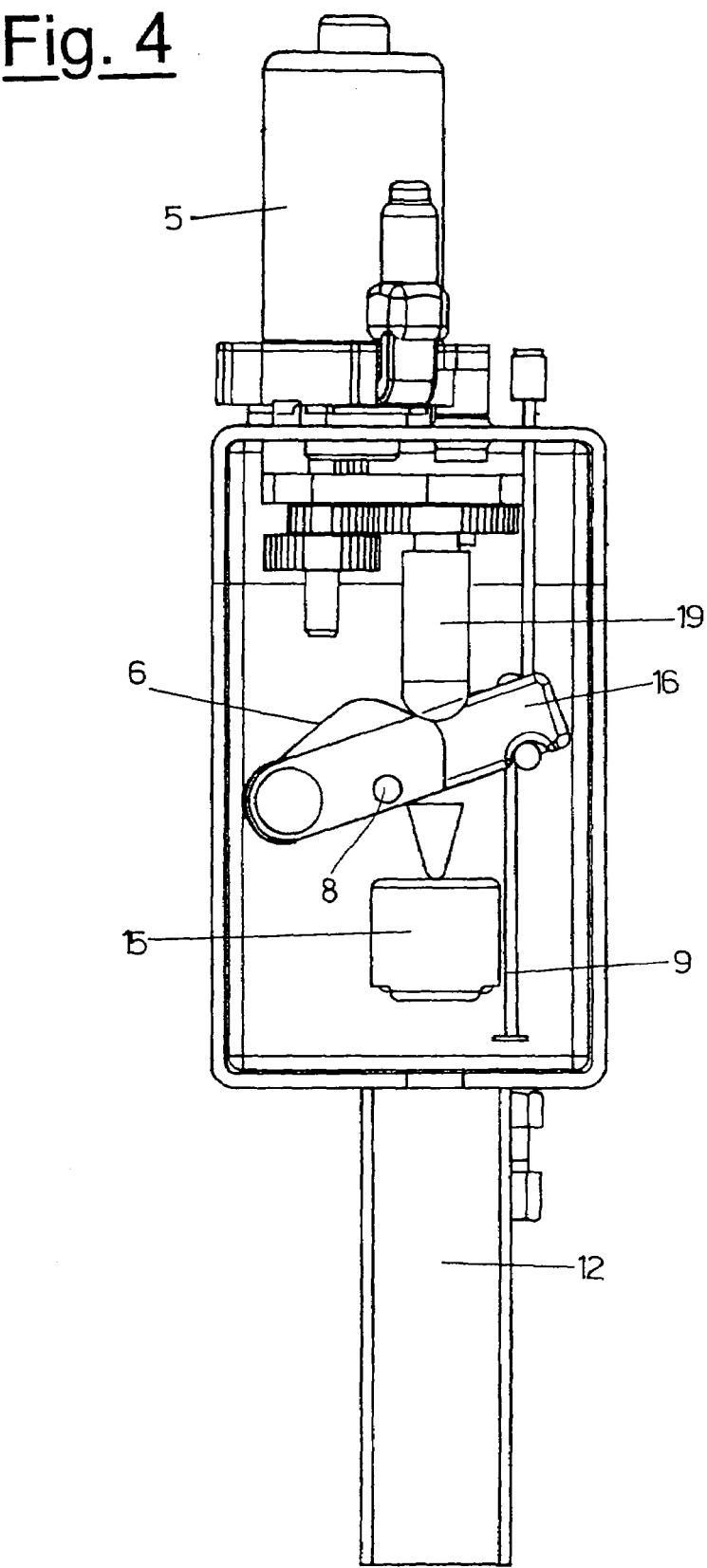
FIG. 4 is an axonometric view of an alternative embodiment for the selective actuation device according to the present invention.

An alternative solution for a different embodiment of the actuation device is described in FIGS. 4 and 5. This alternative distinguishes itself from the one described previously for the absence of the two gears 24, 25 that transmit the thrust of the worm screw 19 to the lever 7.

The lever 7, advantageously pivoted at 8, commands, also in this embodiment, the brake-shoe of the rear brake 10, through the transmission cable 9 and the release element 16.

At the same time as the actuation of the lever element 16, the actuator 5 acts, by means of the worm screw 19 and of the cam 6, upon the thrusters 7b, so as to actuate the pump 12 of the hydraulic circuit 13.

In detail, the lever 7, pivoted at 8, through a Belleville spring 15 actuates the pump 12 that activates the hydraulic circuit 13 for the operation of the locking device 3 of the anti-rolling system and of the stroke stop devices 14, 14' of the front suspensions.

Also in this case, the cam 6 has two positions. In particular, the rest position allows the actuation of the first operating group, again represented by the oil pump 12 and by the circuit 13, to be disassociated from the actuation of the second operating group 9, 10.

The rest position of the cam 6 allows the lever 7 to disassociate itself from the lever element 16, and in such a way it is possible to actuate just the first operating group 12, 13 independently of the rear brake 10.

Also in this situation, irrespective of the position of the cam 6, the actuation of the rear brake 10 of the vehicle never involves the activation of the first operating group 12, 13.

Vive-versa, the actuation of the first operating group 12, 13 through the selective actuation device, object of the present invention, may or may not involve the activation of the second operating group 9, 10 according to the position of the cam 6.

The present invention has been described for illustrating, but not limiting purposes, according to its preferred embodiments, but it should be understood that variations and/or modifications can be brought by men skilled in the art without for this reason departing from the relative scope of protection, as defined by the attached claims.

The invention claimed is:

1. Actuation device (1) comprising and an actuator (5) acting upon an actuation lever (7) wherein said lever (7) comprises at least one thruster element (7b) for the actuation of a first operating group (12,13) and a cam element (6) which is moved by said actuation lever (7) from an activation position to a rest position by means of command means (26), wherein said command means (26) comprises a desmodromic control said cam element (6) being mobile between an activation position in which said cam element (6) acts upon a second operating group (9,10) and said rest position in which the activation of said first operating group (12, 13) is disassociated from said second operating group (9,10) wherein said first operating group (12,13) comprises a pump (12) connected to a hydraulic circuit (13) acting upon at least one locking device (3) of an anti-rolling system for a vehicle and said second operating group (9,10) comprises a cable (9) and a brake-shoe (10) of a brake for a rear wheel of the vehicle, wherein said actuator (5) acts by means of a worm screw (19) and a pair of gears (24,25) upon said lever (7) to actuate said pump (12) and simultaneously, through a lever element (16), upon said cable (9) of the brake of the rear wheel.

2. Actuation device (1) according to claim 1, wherein in said activation position said actuator (5) acts by means of said worm screw (19) upon said lever (7), which in turn, through a Belleville spring (15) actuates said pump (12) and simultaneously, through said lever element (16), upon said cable (9) of the brake of the rear wheel.

* * * * *